United States Patent
Kivioja

(10) Patent No.: US 11,559,015 B2
(45) Date of Patent: Jan. 24, 2023

(54) METHOD AND ARRANGEMENT FOR GROWING PLANTS ON MULTILAYER PRINCIPLE

(71) Applicant: NETLED OY, Pirkkala (FI)

(72) Inventor: Niko-Matti Kivioja, Siivikkala (FI)

(73) Assignee: NETLED OY, Pirkkala (FI)

(*) Notice: Subject to any disclaimer, the term of this patent is extended or adjusted under 35 U.S.C. 154(b) by 139 days.

(21) Appl. No.: 16/637,196

(22) PCT Filed: Jul. 3, 2018

(86) PCT No.: PCT/FI2018/050528
§ 371 (c)(1),
(2) Date: Feb. 6, 2020

(87) PCT Pub. No.: WO2019/030428
PCT Pub. Date: Feb. 14, 2019

(65) Prior Publication Data
US 2020/0367448 A1    Nov. 26, 2020

(30) Foreign Application Priority Data
Aug. 7, 2017  (FI) .................... 20175713

(51) Int. Cl.
*A01G 31/04* (2006.01)
*A01G 9/029* (2018.01)
(Continued)

(52) U.S. Cl.
CPC ............ *A01G 31/042* (2013.01); *A01C 7/00* (2013.01); *A01G 9/023* (2013.01); *A01G 9/0299* (2018.02); *A01G 27/003* (2013.01)

(58) Field of Classification Search
CPC .... A01G 31/042; A01G 9/0299; A01G 9/022; A01G 9/023; A01G 9/027
See application file for complete search history.

(56) References Cited

U.S. PATENT DOCUMENTS

| 3,664,061 A | 5/1972 | Ocpen | |
|---|---|---|---|
| 2004/0163308 A1* | 8/2004 | Uchiyama | A01C 1/00 47/1.1 |

(Continued)

FOREIGN PATENT DOCUMENTS

| AU | 2009225349 B2 | 8/2016 |
|---|---|---|
| JP | H0847348 A | 2/1996 |

(Continued)

OTHER PUBLICATIONS

Extended European Search Report in corresponding European Application No. 18843747.9 dated Apr. 7, 2021 (8 pages).

(Continued)

*Primary Examiner* — Joshua J Michener
*Assistant Examiner* — Henry Hooper Mudd
(74) *Attorney, Agent, or Firm* — Jeffri A. Kaminski; Venable LLP

(57) ABSTRACT

A method and a system for growing plants on multilayer principle in mobile gutter farming is described, whereby, in the process of growing plants planted in cultivation gutters, said plants are conveyed in cultivation layers present on top of each other in a cultivation space in a longitudinal direction of the cultivation space in one or opposite directions. The cultivation gutters and the plants contained therein, are treated in the cultivation space by means of a processing arrangement in a cultivation layer-specific manner, whereby the cultivation gutters and the plants contained therein are first of all conveyed by motion elements in each cultivation layer of the cultivation space in the longitudinal direction of the cultivation space in opposite directions and are treated by processing elements in each cultivation layer of the cultivation space separately, in a manner substantially independent of the other cultivation layers.

7 Claims, 2 Drawing Sheets

Figure 1A:
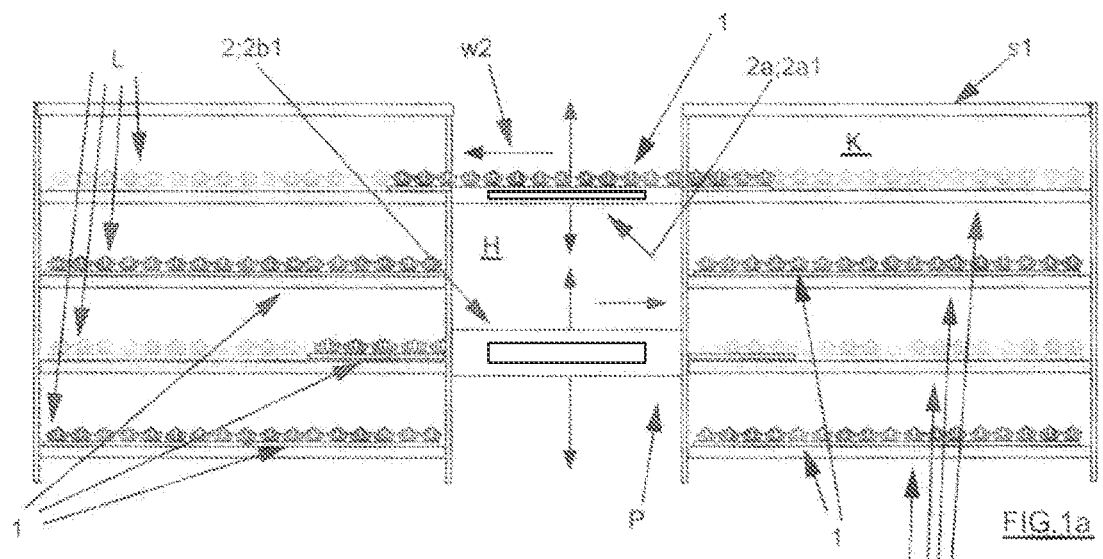

(51) Int. Cl.
*A01C 7/00* (2006.01)
*A01G 9/02* (2018.01)
*A01G 27/00* (2006.01)

(56) References Cited

U.S. PATENT DOCUMENTS

| | | | |
|---|---|---|---|
| 2012/0227322 A1 | 9/2012 | Belmote et al. | |
| 2014/0017043 A1 | 1/2014 | Hirai et al. | |
| 2015/0250115 A1* | 9/2015 | Pickell | A01G 31/02 |
| 2015/0282437 A1 | 10/2015 | Ohara et al. | |

FOREIGN PATENT DOCUMENTS

| | | |
|---|---|---|
| JP | H9-154414 A | 6/1997 |
| JP | 2010-51256 A | 3/2010 |
| JP | 2010-57448 A | 3/2010 |
| JP | 2012-34686 A | 2/2012 |
| JP | 2015-501157 A | 1/2015 |
| JP | 2015-223082 A | 12/2015 |
| JP | 2016-54683 A | 4/2016 |
| KR | 20120021543 A | 3/2012 |
| KR | 101406293 B1 | 6/2014 |
| WO | 2014057800 A1 | 4/2014 |
| WO | 2017024353 A1 | 2/2017 |

OTHER PUBLICATIONS

International Search Report and Written Opinion in corresponding International Application No. PCT/FI2018/050528 dated Oct. 10, 2018 (11 pages).
Japanese Office Action in corresponding Japanese Application No. 2020-507058 dated May 10, 2022 (8 pages).

* cited by examiner

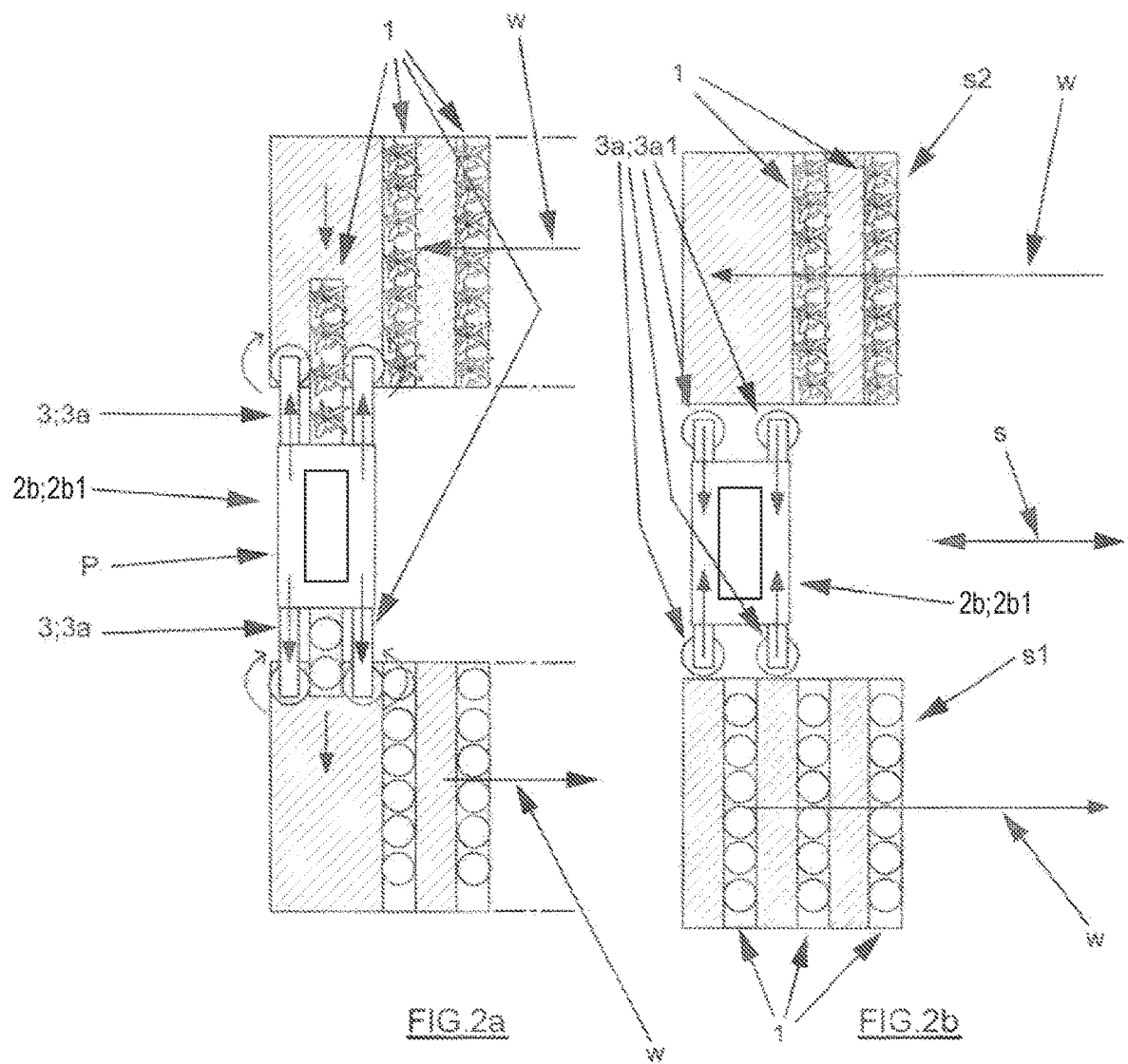

METHOD AND ARRANGEMENT FOR GROWING PLANTS ON MULTILAYER PRINCIPLE

CROSS-REFERENCE TO RELATED APPLICATIONS

This application is a U.S. National Stage application of PCT/FI2018/050528, filed Jul. 3, 2018 and published on Feb. 14, 2019 as WO 2019/030428, which claims the benefit of Finnish Patent Application No. 20175713, filed Aug. 7, 2017, all of which are hereby incorporated by reference in their entireties.

The invention relates to a method and an arrangement for growing plants on multilayer principle, according to the preambles of the independent claims directed thereto.

It is particularly an object of the invention to enhance the growing of plants on multilayer principle, whereby plants planted in cultivation gutters are carried by auxiliary power-operated motion elements in the longitudinal direction of a cultivation space in cultivation layers present on top of each other in the cultivation space.

In this regard, the conventional plant growing technique is represented especially by so-called mobile gutter farming, whereby the roots of to-be-cultivated plants are typically contained in a "root ball" composed of peat. Along the bottom of a cultivation gutter used in such farming flows a thin layer of fertilizer solution from which the plant roots obtain necessary nutrients and water. The cultivation gutters are typically made of a white hard plastic and, depending on to-be-cultivated plants, are provided either with an open top surface or just with holes for the plants. This technique is typically used for planting potted lettuces or so-called babyleaf type growth, wherein the plants are planted in the form of a flat carpet across the entire cultivation gutter. The cultivation gutters are further typically closed at one end thereof and open at the other end, the closed end being used for dispensing a fertilizer solution which flows from the cultivation gutters' open end freely into a collection trough. The required flow rate of fertilizer solution is achieved conventionally by constructing the gutter frame so as to decline towards its open end.

In a so-called first generation of multilayer farming conducted by mobile gutter technique, the cultivation gutters are adapted to travel in one layer of the cultivation space automatically from end to end of a cultivation line, yet are raised to and lowered from the cultivation layers manually. In second generation systems, the cultivation gutters are first carried by a lift down from the end of a line system and then further to buffer storage to wait therein for further processing such as, for example, a harvesting cutter. This is followed by passing the same to gutter draining, disinfecting, refilling, sowing and pre-irrigation, after which the gutters proceed to a next buffer storage to wait for their turn on the lift so as to raise them back to cultivation layers.

However, the second generation systems developed in response to practical needs continue, as presently available, to involve significant drawbacks, one notable example of which is that there is continuously a considerable number of cultivation gutters in buffer storage, waiting either for transfer lifts or a processing stage. In addition, the equipment base involved therein is highly complicated, involving a plethora of moving parts demanding continuous maintenance/upkeep for ensuring reliable operation of the system. Further, particularly because of the buffer storage principle, such systems require the cultivation space to have a very extensive floor surface area. Moreover, the lift assembly removing cultivation gutters from cultivation layers makes a significant bottleneck in the discussed processing, creating downtime e.g. for other process equipment.

It is an objective of the method and the arrangement according to the present invention to provide a decisive improvement regarding the foregoing problems, and to thereby raise substantially the available state of the art. In order to attain this objective, the method and the arrangement of the invention are principally characterized by what is presented in the characterizing clauses of the independent claims directed thereto.

As most important benefits gained by the method and the arrangement of the invention should be mentioned the simplicity and effectiveness of both the equipment solutions involved therein and the use thereof, thereby enabling a remarkable improvement in the cost effectiveness of especially mobile gutter farming by virtue of the fact that all expensive technology- and automation-demanding logistic parts and components of the plant growing apparatus are possible to implement with highly compact and easy-to-maintain equipment solutions. According to the invention, the cultivation gutters are operated in side-by-side cultivation line systems longitudinally of the cultivation space in opposite directions. Hence, the motion elements of a processing arrangement present in the cultivation space include preferably a transfer device present between oppositely directed cultivation lines of the cultivation space, by which the cultivation gutters are shifted from what in transverse sense is a cultivation line passing in a first direction onto a cultivation line passing in a second direction. By virtue of such a system, as the cultivation gutters remain, without departing from cultivation layers, vertically always at the same plane and in the same cultivation layer, it is possible to automate the growing of plants by making use of a processing device, which is present between the oppositely-directed cultivation lines of the cultivation space, and by which the cultivation gutters and the plants contained therein are shifted in lateral direction from a cultivation line extending in a second direction for the processing of plants and cultivation gutters, such as for the harvesting of plants, removing of substrate waste, washing/disinfecting of cultivation gutters, placing of fresh substrate, sowing/planting of plants, pre-irrigation thereof, and/or the like purpose. An essential feature in the invention is that, when a cultivation gutter is shifted by the processing device from an incoming line system onto an outgoing line system, it is processed at the same time, whereafter, having passed through the processing device, it is immediately ready for the next cultivation cycle. Therefore, all the foregoing processing stages for cultivation gutters take place in a single operation without e.g. the maneuvering of cultivation gutters from one processing stage to another.

The invention enables production of various plant species in discrete layers, thereby simplifying such a system considerably and preventing various plants from blending into each other in the production process. However, a system using the method of the invention for its operation need not necessarily include automated processing, enabling the working personnel and the working area to be raised, e.g. with a platform lift, to a convenient height for the processing of each presently treated cultivation layer, whereby just the workers/equipment are moving in vertical direction instead of cultivation gutters/tables.

Other preferred embodiments for a method and an arrangement of the invention are presented in the dependent claims directed thereto.

Figure 1B:
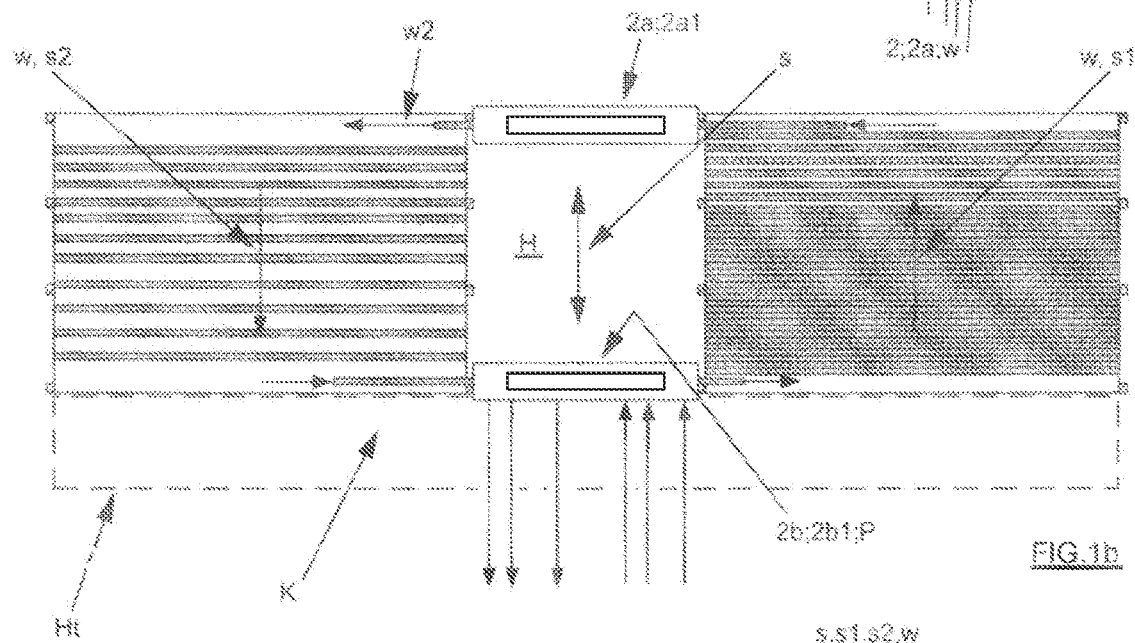
Figure 1C:
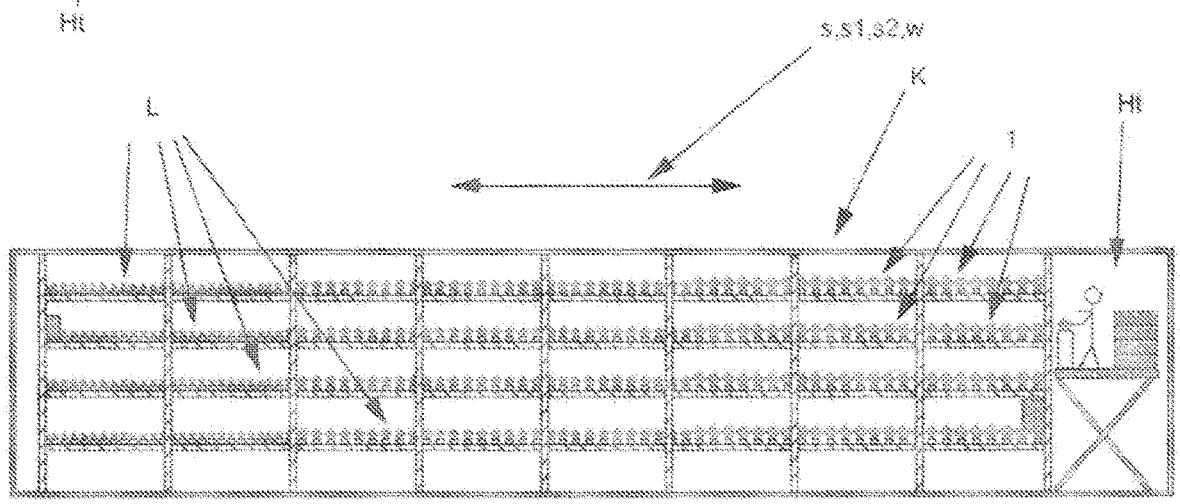

In the subsequent description, the invention will be specified in detail with reference to the accompanying drawings, in which FIGS. 1a-1c
show, in an end view, a plan view, and a side view, some exemplary apparatus solutions related to the makeup of a method and an arrangement of the invention, and FIGS. 2a and 2b
show, in a plan view, exemplary plant engineering related to a lateral shift of cultivation gutters to be performed specifically with the processing arrangement.

The invention relates first of all to a method for growing plants on multilayer principle in mobile gutter farming, whereby, in the process of growing plants planted in cultivation gutters 1, said plants are conveyed w with auxiliary power-operated motion elements in cultivation layers L present on top of each other in a cultivation space K in a longitudinal direction s of the cultivation space in one or opposite directions. The cultivation gutters 1 used especially in mobile gutter farming, and the plants contained therein, are treated on a principle illustrated in FIGS. 1a-1c in the cultivation space K by means of a processing arrangement 2 in a cultivation layer-specific manner, whereby the cultivation gutters and the plants contained therein are first of all conveyed w, as depicted especially in FIGS. 1a and 1b, by motion elements 2a in each cultivation layer L of the cultivation space K in the longitudinal direction s of the cultivation space in opposite directions and, on the other hand, are treated P by processing elements 2b in each cultivation layer L of the cultivation space separately, in a manner substantially independent of the other cultivation layers.

In a preferred embodiment for a method of the invention, the cultivation gutters are shifted w2 in lateral direction from a cultivation line s1 proceeding in a first direction onto a cultivation line s2 proceeding in a second direction by means of a transfer device 2a1, which is included in the processing arrangement's motion elements 2a and which is present in a gap H between the oppositely directed cultivation lines s1, s2.

In an embodiment of the method further preferred in this context, the cultivation gutters 1, and the plants contained therein, are shifted by a processing device 2b1, which is included in the processing arrangement's processing elements 2b and which is present in the gap H between the cultivation lines s1, s2, in a lateral direction w2 from the cultivation line s2 extending in the second direction for processing P the plants and the cultivation gutters 1, such as for harvesting the plants, removing substrate waste, washing/disinfecting the cultivation gutters, placing fresh substrate, sowing/planting the plants, pre-irrigating the same, and/or the like purpose, and/or for returning the same onto the cultivation line s1 extending in the first direction.

In an embodiment of the method, further preferred for the invention, the cultivation gutters 1 in two or more cultivation layers L of the cultivation space K, and the plants contained therein, are treated in a cultivation layer-specific manner with the transfer device 2a1 and the processing device 2b1, which are operated by a lift and which are included in the processing arrangement 2.

In an embodiment of the method further preferred for the invention, the cultivation gutters 1 and the plants contained therein are treated with actuators 3, which are provided in the processing arrangement 2 and are preferably, moreover, automatically controlled, such as, referring particularly to FIGS. 2a and 2b, with gripping elements 3a included in the transfer device 2a1 and in the processing device 2b1 and making it possible to take hold of the cultivation gutters 1 and to shift w2 the same in lateral direction, and/or with e.g. harvesting, scraping, washing/disinfecting, substrate-placing, seed/seedling-planting and/or pre-irrigating elements and/or the like included in the processing device 2b1.

The invention also relates, on the other hand, to a system for applying the above-described method, including, with particular reference to FIGS. 1a and 1b, a processing arrangement 2 for treating cultivation gutters 1 used especially in mobile gutter farming, and plants contained therein, in a cultivation space K in a cultivation layer-specific manner, said processing arrangement including first of all motion elements 2a for conveying w the cultivation gutters and the plants contained therein in each cultivation layer L of the cultivation space K in a longitudinal direction s of the cultivation space in opposite directions, and, on the other hand, processing elements 2b for treating P the same in each cultivation layer L of the cultivation space separately, in a manner substantially independent of the other cultivation layers.

In an embodiment of the system further preferred for the invention, with particular reference to FIGS. 2a and 2b, the motion elements 2a of its processing arrangement include a transfer device 2a1 present in a gap H between oppositely directed cultivation lines s1, s2 for shifting w2 the cultivation gutters in lateral direction from the cultivation line proceeding in a first direction onto the cultivation line proceeding in a second direction.

In an embodiment of the system further preferred for the invention in this context, the processing elements 2b of the processing arrangement 2 include a processing device 2b1 present in the gap H between the oppositely directed cultivation lines s1, s2 of the cultivation space K for shifting w2 the cultivation gutters 1, and plants contained therein, in lateral direction thereon from the cultivation line s2 extending in the second direction for processing P the plants and the cultivation gutters 1, such as for harvesting the plants, removing substrate waste, washing/disinfecting the cultivation gutters, placing fresh substrate, sowing/planting the plants, pre-irrigating the same, and/or the like purpose, and/or for returning the same onto the cultivation line s1 extending in the first direction.

In an embodiment of the system further preferred for the invention, the processing arrangement 2 includes a transfer device 2a1 and a processing device 2b1, which are operated by a lift and which enable the cultivation gutters 1 present in two or more superimposed cultivation layers L of the cultivation space K, and the plants contained therein, to be treated in a cultivation layer-specific manner.

In an embodiment of the system further preferred for the invention, its processing arrangement 2 includes most preferably automatically controlled actuators 3, which are provided in the processing arrangement 2 for treating the cultivation gutters 1 and the plants contained therein, such as gripping and shifting elements 3a included in the transfer device 2a1 and in the processing device 2b1 and making it possible to take hold of the cultivation gutters 1 and to shift w2 the same in lateral direction, and/or harvesting, scraping, washing/disinfecting, substrate-placing, seed/seedling-planting and/or pre-irrigating elements, and/or the like (not shown, however, more specifically in the drawings).

In particular reference to FIGS. 2a and 2b, the above-described gripping and shifting elements are implemented by way of drive rollers 3a1, which are present in the transfer and processing devices 2a1 and 2b1 and included in laterally movable transfer arms 3a and which, by rotation, carry out a shifting in lateral direction of the cultivation gutter 1 retained therebetween.

In terms of mobile gutter farming, the present invention represents a so-called third generation vertical farming principle, which particularly enables shifting of the cultivation gutters 1 to be minimized as the latter, in a preferred embodiment, are circling continuously e.g. in two side-by-side cultivation lines. Thus, after the sowing, the cultivation lines start moving, e.g. on the principle depicted in FIGS. 1a-1c and 2a, 2b, forward in a cultivation layer L present in the right-hand cultivation line s1, whereby the mutual distance between the cultivation gutters 1 changes according to space required by presently cultivated plants as the gutters travel in a longitudinal direction s. As the cultivation gutter reaches the other end of a cultivation line in question, it will be shifted w2, with reference to FIGS. 2a and 2b, e.g. by means of the transfer device 2a1 with an operating principle as depicted e.g. in FIGS. 2a and 2b into a respective cultivation layer L of the left-hand cultivation line s2, wherein it continues its movement to a harvesting end while the mutual distance between the cultivation gutters 1 continues increasing as required at this time. Upon reaching the harvesting end, the cultivation gutter proceeds through the processing device 2b1, at which point it is possible, in a preferred embodiment, to carry out all the processing procedures while the cultivation gutter 1 shifts from the left-hand cultivation line onto the right-hand cultivation line, which procedures, e.g. in second generation vertical farming solutions, are implemented in a separate space.

From the standpoint of implementing the invention, it is naturally not significant as to how and by what type of cultivation lines are employed for maneuvering the cultivation gutters in a cultivation space as the most essential principle of the invention is that the cultivation gutters 1 shall not at any time be shifted away from the cultivation layer-specific cultivation lines s1, s2, whereby all necessary processing of cultivation gutters, and plants contained therein, also takes place in the cultivation layers as the latter are traveling from harvesting end to forward end of the cultivation line.

Another fundamental principle of the invention is also that the processing device and the transfer device, included in a system applying the invention, are coupled integrally with lift-operated structures, which enables e.g. the use of just one such processing device for the processing of all cultivation layers. On the other hand, it is possible to increase processing speed of the cultivation apparatus by using e.g. two or more processing devices one above the other, whereby bottom layers are processed by the lower device and top layers by the upper device as each device is moving between several cultivation layers without the need for a cultivation layer-specific processing apparatus.

It is obvious that the invention is not limited to above-described or -explained embodiments, but it can be modified as necessary within the basic concept of the invention. Therefore, it is first of all clear that the system of the invention may include a more or less automatic processing apparatus, enabling its operation, as presented e.g. with a dashed line in FIG. 1b and on a principle as depicted in FIG. 1c, for so-called manual processing, whereby the worker present on a working platform movable vertically in a working space Ht can be elevated e.g. with a platform lift to an ergonomically appropriate height for processing each cultivation layer to be treated. The system of the invention further enables flexible utilization of varying levels of automation, whereby e.g. the lowest level is totally manual.

The next level of automation comprises e.g. the utilization of automated harvesting, but the draining, cleaning and refilling, as well as the sowing of cultivation gutters are performed manually. From here forward, the process stages can be automated in a flexible manner all the way to fully automated processing.

In terms of the present invention, it is practically meaningless e.g. which substrate materials, cultivation space structures or other technology related to cultivation of plants, such as packing, weighing or the like equipment for plants, are used in connection therewith, in addition to which it is possible to vary implementations of the invention with per se conventional equipment solutions and automated adjustments regarding e.g. the indoor climate and lighting conditions of a cultivation space, etc.

It is possible that the equipment engineering-related solutions for a transfer device and a processing device operating in accordance with the invention, regarding especially the lift operation thereof, be implemented with largely identical features, whereby the processing device only needs to be supplemented with tools related to processing. The lift frame used for this purpose can be e.g. a so-called modular aperture panel frame with a possibility of modularly attaching thereto each time desired tools, which can be e.g.:

headlettuce harvester: a cutter which cuts the head of large, over 100 g lettuce off at a base and drops it onto a conveyor, babyleaf harvester: a cutter which cuts, either on a scissors principle or with a high-speed rotating blade cutter, lettuce mat off the surface of a gutter and drops it onto a conveyor, substrate extractor: a substrate scraper which scrapes substrate off the cultivation gutter and drops it onto a waste conveyor, pressure washer: a unit which washes the cultivation gutter with high-pressure water, substrate injector: a device which places a fresh substrate in the cultivation gutter, sowing machine: a device which scatters new seeds on the substrate, and pre-irrigation device which performs pre-irrigation of the substrate before the cultivation gutter is conveyed to a forward end of the cultivation line.

The invention claimed is:

1. A method for growing plants planted in cultivation gutters on multilayer principle in mobile cultivation gutter farming including cultivation layers present on top of each other in a cultivation space, each cultivation layer having a first cultivation line in the longitudinal direction of the cultivation space and a second cultivation line in an opposite direction with respect to the longitudinal direction, the method comprising:

conveying said plants with auxiliary power-operated motion elements in the cultivation layers the first cultivation line in the longitudinal direction of the cultivation space;

shifting the cultivation gutters in lateral direction from the first cultivation line onto the second cultivation line with a respective transfer device, the transfer device being disposed in a gap between respective first and second cultivation lines;

conveying said plants thereafter in the second cultivation line in an opposite direction with respect to the longitudinal direction;

treating the cultivation gutters, and the plants contained therein in the cultivation space by means of a processing devices on each cultivation layer of the cultivation space separately, in a manner substantially independent of the other cultivation layers; and returning the cultivation gutters with the processing devices onto the first cultivation line.

2. A method according to claim 1, further comprising shifting the cultivation gutters in lateral direction from the second cultivation line onto the first cultivation line with a respective processing device.

3. A method according to claim 1, wherein the cultivation gutters on the cultivation layers of the cultivation space, and the plants contained therein, are treated in a cultivation layer-specific manner with the transfer device and the processing device, which are operated by a lift.

4. A method according to claim 1, wherein the cultivation gutters and the plants contained therein are treated with actuators, which are automatically controlled with gripping elements included in the transfer device and in the processing device which take hold of the cultivation gutters and shift the same in lateral direction.

5. A system for growing plants on multilayer principle in mobile gutter farming, said system comprising:

a plurality of cultivation layers arranged vertically in a cultivation space;

cultivation gutters arranged in each cultivation layer, each cultivation layers including a first cultivation line in the longitudinal direction of the cultivation space and a second cultivation line in opposite direction with respect to the longitudinal direction, the first cultivation line and the second cultivation line defining a gap therebetween;

motion elements of each cultivation layers to convey the cultivation gutters along the first and second cultivation lines;

a transfer device present in a gap between oppositely directed cultivation lines for shifting the cultivation gutters in lateral direction from the first cultivation line onto the second cultivation line; and processing devices for treating the cultivation gutters and the plants contained therein on each cultivation layer of the cultivation space separately, in a manner substantially independent of the other cultivation layers, wherein the processing device returns the cultivation gutters onto the first cultivation line.

6. A system according to claim 5, wherein the transfer device and the processing device are operated by a lift and are used for treating the cultivation gutters present on the cultivation layers of the cultivation space, and the plants contained therein, in a cultivation layer-specific manner.

7. A system according to claim 6, wherein the system further includes automatically controlled actuators for treating the cultivation gutters and the plants contained therein.

* * * * *